April 7, 1970 F. B. McKEE 3,505,618

MICROWAVE FILTERS

Filed May 4, 1967

INVENTOR

Frederick Brian McKee

BY

Baldwin Wight Diller & Brown

ATTORNEYS 3,505,618
Patented Apr. 7, 1970

3,505,618

MICROWAVE FILTERS

Frederick Brian McKee, Burnham-on-Crouch, England, assignor to The Marconi Company Limited, London, England, a British company Filed May 4, 1967, Ser. No. 636,049
Claims priority, application Great Britain, June 8, 1966, 25,495/66
Int. Cl. H03h *7/10, 1/00*
U.S. Cl. 333—73 11 Claims

ABSTRACT OF THE DISCLOSURE

A microwave filter consists of a block of dielectric material which is coated with a conductive film on its outer surface to constitute the housing. The block is provided with holes and conductive members may be constituted by deposits of conductive film on the walls of the holes or they may be constituted by a combination of the conductive film and rods which fit in the holes and contact with the deposits of conductive film. The filter characteristic may be made adjustable by threading the rods so that they may be adjustably screwed in the holes.

This invention relates to microwave filters and more particularly to microwave filters of the kind in which the electrical equivalent of a required filter circuit composed of lumped reactances of required pre-determined values is obtained by means of a structure composed of conductive members of pre-determined shapes and dimensions mounted in pre-determined positions in and in electrical connection with a conductive box which is also of predetermined shape and dimensions, the necessary required reactances in the required positions in the filter circuit being provided by said members and by said box and being determined by the dimensions of the members and of the box and by the physical relationships of said members to one another and to the box. For the sake of brevity of description microwave filters of this kind will be hereinafter referred to as "conductive housing filter structures."

Figure 1:
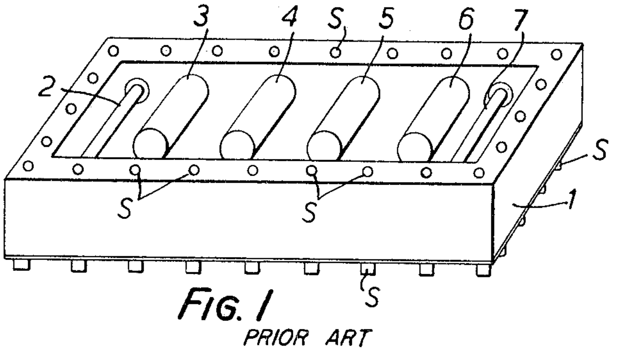
FIG. 1 PRIOR ART
Figure 2:
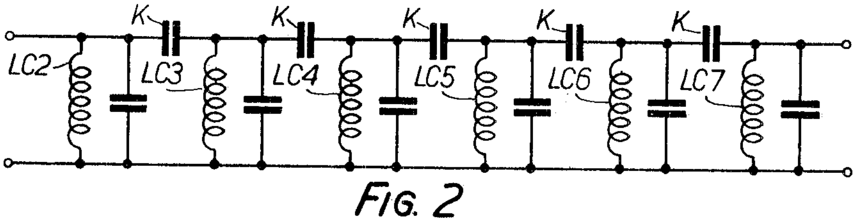
FIG. 2 PRIOR ART
Figure 3:
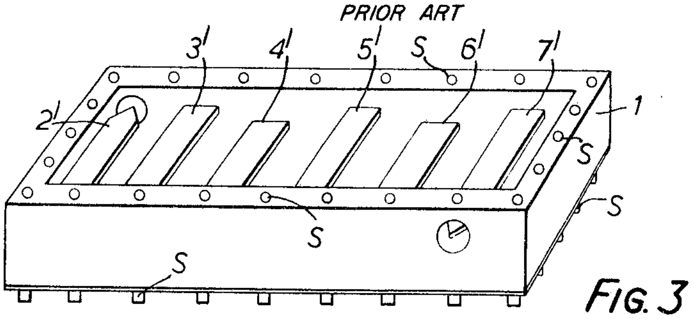
FIG. 3 PRIOR ART
Figures 4, 5:
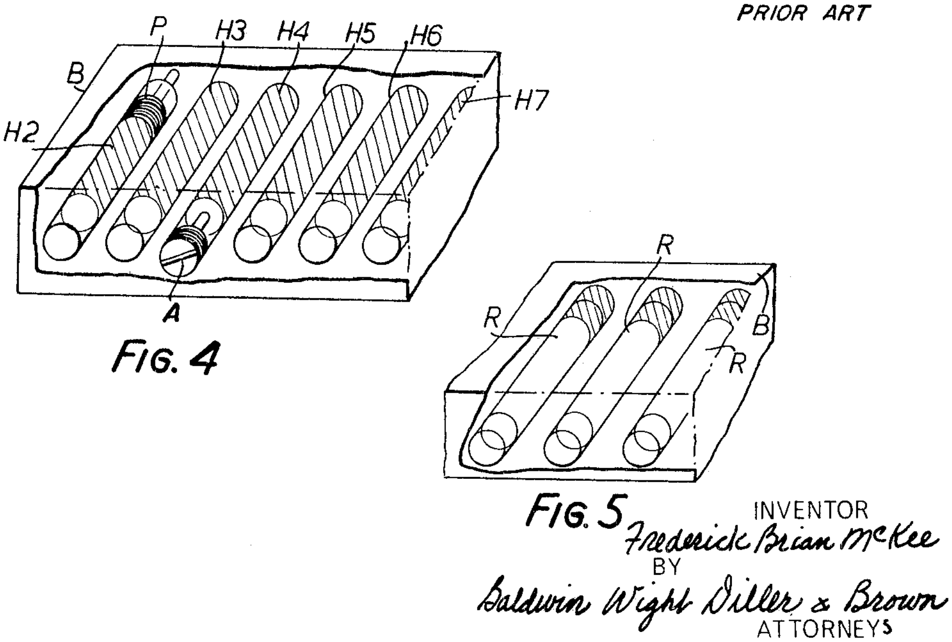

The invention is illustrated in and explained in connection with the accompanying drawings in which FIGURE 1 shows a known conductive housing filter structure with the lid removed; FIGURE 2 is a filter circuit which is approximately, and sufficiently for present purposes, the lumped reactance equivalent circuit of the filter structure of FIGURE 1; FIGURE 3 shows another known form of conductive housing filter structure with the lid removed; FIGURE 4 shows, broken away, a conductive housing filter structure in accordance with this invention; and FIGURE 5 is a part view illustrating a modified form of construction in accordance with this invention. FIGURES 1, 2 and 3 are provided for purposes of explanation only and do not illustrate the present invention.

In the known filter structure of FIGURE 1 there is a precisely made and dimensioned metal box 1. In the box are a plurality of carefully machined and dimensioned metal members in precisely determined positions. In the particular filter structure of FIGURE 1 there are six parallel cylindrical membes 2, 3, 4, 5, 6 and 7 of which the cylinders 2 and 7 are of smaller diameter than the others and, unlike the others, extend right across the box, making connection with the side which is nearer the observer in the figure. The cylinders 3 to 6 inclusive are in conductive connection with one side wall of the box and project towards but do not reach the opposite wall i.e. the wall nearer the observer in the figure. The small diameter cylinders 2 and 7 are carried by insulators (not shown) in holes in the box and are constructed and arranged to enable co-axial cables (not shown), serving as microwave input and output cables, to be plugged into the holes from outside the box so that their inner conductors contact with the cylinders 1 and 7.

A filter structure as shown in FIGURE 1 is what is usually known as a "comb-line" filter. Its approximately equivalent circuit is shown in FIGURE 2. It has an input tuned circuit LC2 an output tuned circuit LC7, four intermediate tuned circuits LC3 to LC6 inclusive and coupling capacitances K. The inductances of the tuned circuits are, in the main, provided by the inductances of the cylinders 2 to 7; the capacitances of said tuned circuits are, in the main, provided by the capacitances between the ends of the cylinders 2 to 7 and the box wall towards which they project but do not reach; and the coupling capacitances are, in the main provided by the capacitances between adjacent cylinders.

FIGURE 3 shows a known conductive housing filter structure of the interdigital type. Its equivalent circuit is not shown but its nature will be known to those skilled in the art. The principal difference between the filters of FIGURES 3 and 1 is that in FIGURE 3 the conductive members in the box 1, here referenced 2′ to 7′ do not all extend towards the same box wall but alternate members extend towards one box wall and the remainder extend towards the other. Members 2′ and 7′ are respectively for input and output and are insulatingly supported from holes and are arranged, as in FIGURE 1, to be put into connection with the inner conductors of co-axial cables (not shown) plugged into the holes from outside the box. The members 2′, 4′ and 6′ are in galvanic connection with one wall of the box (the nearest wall in FIGURE 3) and the members 3′, 5′ and 7′ are in galvanic connection with the opposite wall. In FIGURE 3 the conductive members are shown as bars or steps instead of as cylinders but conductive members of any of a variety of sectional shapes and form may be used in either comb-line or interdigital filters. Also, of course, any desired number of conductive members may be employed in either case. Infact FIGURES 1 and 3 are intended only to exemplify the kind of filter structure to which the invention relates.

Very high precision of dimensioning is required in conductive housing filter structures. In known structures this precision is sometimes obtained by machining the box (except for the lid and bottom) and sometimes also the conductive members, from a solid block of metal. This is obviously very expensive. In other cases, in order to avoid such very expensive machining, the box is fabricated from good quality strong and stiff metal plate and the conductive members are fabricated separately. This too is an expensive manufacturing process though not so expensive as machining from the solid. Whatever method of manufacture is employed it is necessary that component part surfaces which must contact with one another must meet in such a way as to give really first class low resistance contact otherwise the Q value of the filter will be degraded. This too increases the precision of manufacture and therefore the cost: thus, for example, even in the case of a filter machined from the solid with only the top and bottom of the lid as separate parts, these parts have to be held in place by a multiplicity of screws e.g. as indicated at S in FIGURES 1 and 3. In short the known structures as illustrated in FIGURES 1 and 3 are costly to manufacture—especially when a number of filter structures having to be matched to one another is required—and heavy.

However, quite apart from their defects from the manufacturing point of view, known structures as illustrated in FIGURES 1 and 3 have a serious operating defect namely that they are very prone to what may be termed "microphony." If they are subjected to mechanical vibration or shock the conductive members, especially if they have narrow cross sectional dimensions—for example thin cylindrical members or thin bar-form members—are liable to be set into vibration and if this happens the high frequency energy in the filter will be undesirably modulated. This is a very serious defect.

The present invention seeks to provide improved conductive housing filter structures in which the foregoing defects of known structures as typified by FIGURES 1 and 3 will be to a large extent reduced and, in particular, in which the important defect of microphony will be, for practical purposes, eliminated altogether.

According to this invention a conductive housing filter structure consists of a block of dielectric material the exterior of which is provided with an external deposit of conductive film to constitute the "box" or "housing" and which is provided with holes the interior walls of which are wholly or partly coated with conductive film to constitute the conductive members or parts thereof.

One or more of the conductive members may be wholly constituted by deposits or coatings of conductive film on the walls of the holes or they may be partly constituted thereby and partly constituted by metallic members, e.g. rods or bars, which are push fits in the holes and push into and contact with the deposits on the walls thereof. The holes may be of any desired arrangement and cross sectional shape but the simplest arrangement is that in which the holes are constituted by a plurality of circularly sectioned parallel holes extending right through the block.

Where adjustment of filter characteristics after manufacture is required, this may be readily achieved by providing screwed metal or dielectric plugs adjustably screwed into the ends of holes (where required) and projecting to an adjustable extent with respect to, but out of contact with, the conductive members in those holes.

Preferably the deposited film is electrolytically deposited but other suitable methods of deposition, known per se, may be used. Silver is a very suitable deposited film material. Any of a variety of dielectric materials may be used for the block but polystyrene is very suitable.

Preferably, the deposited film surfaces are protected by coatings of hard plastic material thereover.

FIGURE 4 shows by way of example only, a conductively housed filter structure in accordance with this invention. FIGURE 4, like FIGURE 1, shows a comb-like filter but the invention may be equally well applied to interdigital filters, like that of FIGURE 3, or indeed to any form of conductively housed filter. In FIGURE 4 the film deposits are represented by shading and that on the outside of the block is shown broken away and to permit the interior to be seen.

Referring to FIGURE 4, B is a solid rectangular block of polystyrene accurately machined to the required overall dimensions. It is provided with transverse circularly sectioned holes H2 to H7 which are, in the particular embodiment illustrated in FIGURE 4, parallel to one another and extend right through the block. The interior walls of these holes are coated over the required lengths as indicated, and the whole exterior surface of the block is also coated with electrolytically deposited silver film. The coatings on the walls of the holes replace the cylinders 2 to 7 of FIGURE 1 and perform the same function and similarly the coating on the exterior of the block replaces the box 1 of FIGURE 1. These coatings are quite adequate for their functions owing to the high frequencies for which the filter is intended—megacycle frequencies up to 3000 mc./s. or higher if required. Provision is made for receiving co-axial input and output cables (not shown) in the ends of the holes H2 and H7: for example, as indicated for hole H2, the appropriate end of this hole may be screw threaded to permit the outer end of a co-axial cable connector (not shown) to be screwed in and it may be provided with a disc and pin connector P fitted into the end of the plating in the hole and adapted to connect with the inner of the connector. If adjustment of filter characteristics after manufacture is required, this may be obtained by providing one or more of the holes with a screwed plug the end of which is of smaller diameter than the hole and projects to an adjustable extent into the plating therein. Such an adjusting plug is shown at A in the end of hole H4 of FIGURE 4 but such plugs may, if required be provided in any or all of the holes.

Finally the whole structure is given a protective coating of hard plastic so as mechanically to protect what would otherwise be unprotected silver deposit.

In the modification partly shown in the broken away view of FIGURE 5 and which may be applied to any or all of the conductive members of a filter in accordance with the invention, the metal deposit does not extend over the whole length of a hole but is provided only at one end thereof, namely the end where the plating is continuous with the plating on the exterior of the box. (It will be understood that in FIGURE 5 the necessary electrical contact between the conductive members and the "box" or "housing" is obtained by the plating on the interior of the holes continuing, at the appropriate ends, into the plating on the exterior of the block). Into the unplated end of the hole is inserted rod R for example of brass, of the required length one end of which fits with a push fit into the plated portion.

It will be seen that a filter in accordance with this invention will be much cheaper and lighter than a comparable known filter. If the number of filters to a given design is large enough to justify the cost of the necessary mould, the block, complete with its holes may be made by die-casting—a method of manufacture for which polystyrene is very suitable. This will further reduce machining. Obviously, if prefered, the block need not be a one piece body but can be a composite body made up from two or more separate moulded or otherwise formed parts suitably fixed together. Filters of the same design will be to a high degree alike i.e. there will be good consistency of products in manufacture. The number of parts to be fitted together is a minimum so that difficulties due to resistive contacts are much reduced and high Q values are readily obtainable. Moreover, owning to the high specific inductive capacity of solid insulating material as compared with air, filters in accordance with this invention are smaller than known comparable filters. In addition they are of high temperature stability and freedom from variation due to humidity variations. And finally, and most importantly, they are for all practical purposes immune from microphony.

I claim:

1. A conductive housing filter structure comprising a block of dielectric material, an external deposit of conductive material on the exterior of said block, a plurality of holes extending into the interior of said block, and a conductive film on at least a portion of the interior wall of at least one of said holes, said external deposit constituting a housing and the conductive film constituting at least a part of a conductive member in said at least one of said holes.

2. A filter structure as claimed in claim 1 wherein said conductive film contacts said external deposit at at least one end of said at least one of said holes.

3. A filter structure as claimed in claim 1 wherein said conductive member is partly constituted by said conductive film on a portion of the interior wall of said at least one of said holes and partly constituted by a metallic member push-fit into said at least one of said holes in contact with the conductive film on the interior wall of said at least one of said holes.

4. A filter structure as claimed in claim 1 wherein said at least one of said holes is constituted by a circularly sectioned hole extending through the block.

5. A filter structure as claimed in claim 1 including a metal or dielectric plug adjustably screwed into an end of said at least one of said holes and projecting to an adjustable extent with respect to, but out of contact with, the conductive member in said at least one of said holes whereby adjustment of filter charcteristics may be achieved.

6. A filter structure as claimed in claim 1 wherein the conductive film is electrolytically deposited.

7. A filter structure as claimed in claim 1 wherein the conductive film material and the material of the external deposit are silver and the dielectric material is polystyrene.

8. A filter structure as claimed in claim 1 wherein the conductive film and external deposit surfaces are protected by coatings of hard plastic material thereover.

9. A filter structure as claimed in claim 1 including a separate conductive film on at least a portion of the interior wall of each of said holes, each conductive film constituting at least a part of individual conductive members of a plurality of conductive members.

10. A conductive housing filter structure comprising a block of dielectric material, a deposit of conductive material on the exterior of said block, a plurality of holes extending into the interior of said block, and a conductive member in at least one of said holes, said conductive member being in electrical contact with said deposit at at least one end of said at least one of said holes.

11. A filter structure as claimed in claim 10 including a separate conductive member in each one of said holes, each of said conductive members being in contact with said deposit at at least one end of respective holes.

References Cited

UNITED STATES PATENTS

| | | | |
|---|---|---|---|
| 2,629,015 | 2/1953 | Reed. | |
| 2,749,523 | 6/1956 | Dishal. | |
| 2,761,137 | 8/1956 | Van Atta | 343—785 X |
| 3,349,287 | 10/1967 | Johnson. | |
| 3,375,407 | 3/1968 | Rosenstand. | |

HERMAN KARL SAALBACH, Primary Examiner

U.S. Cl. X.R.

333—70